US008572096B1

(12) United States Patent
Seth et al.

(10) Patent No.: US 8,572,096 B1
(45) Date of Patent: Oct. 29, 2013

(54) SELECTING KEYWORDS USING CO-VISITATION INFORMATION (75) Inventors: Rohan Seth, San Francisco, CA (US); Shumeet Baluja, Leesburg, VA (US); Dandapani Sivakumar, Cupertino, CA (US); Deepak Ravichandran, Mountain View, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 13/297,544

(22) Filed: Nov. 16, 2011

Related U.S. Application Data (60) Provisional application No. 61/515,364, filed on Aug. 5, 2011.

(51) Int. Cl.
*G06F 17/30* (2006.01)

(52) U.S. Cl.
USPC ............. 707/748; 707/E17.084; 707/737

(58) Field of Classification Search
CPC ............ G06F 17/30864; G06F 17/30867; G06Q 30/02
USPC .................. 707/748, 736, E17.084, 737
See application file for complete search history.

(56) References Cited

U.S. PATENT DOCUMENTS

| | | | |
|---|---|---|---|
| 6,212,517 B1 * | 4/2001 | Sato et al. ................ 707/749 |
| 6,631,368 B1 | 10/2003 | Adelman et al. |
| 7,120,590 B1 | 10/2006 | Eisen et al. |
| 7,599,917 B2 * | 10/2009 | Meyerzon et al. ................ 1/1 |
| 7,620,622 B1 | 11/2009 | Larsson et al. |
| 7,647,316 B2 | 1/2010 | Patel et al. |
| 7,761,448 B2 * | 7/2010 | Meyerzon et al. ........... 707/731 |
| 7,827,181 B2 * | 11/2010 | Petriuc .......................... 707/742 |
| 7,831,111 B2 * | 11/2010 | Shah et al. .................... 382/305 |
| 7,831,586 B2 * | 11/2010 | Reitter et al. ................. 707/709 |
| 7,945,565 B2 * | 5/2011 | Poblete et al. ............... 707/722 |
| 7,966,632 B1 * | 6/2011 | Pan et al. ....................... 725/46 |
| 8,065,254 B1 * | 11/2011 | Das et al. ....................... 706/46 |
| 8,065,611 B1 * | 11/2011 | Chan et al. ................... 715/253 |

(Continued)

FOREIGN PATENT DOCUMENTS

| | | |
|---|---|---|
| WO | WO 2006/050069 | 5/2006 |
| WO | WO 2008/141295 | 11/2008 |
| WO | WO 2011/072434 | 6/2011 |
| WO | WO 2012/000423 | 1/2012 |

OTHER PUBLICATIONS

Jing et al., "Keyword Propagation for Image Retrieval", IEEE, ISCAS 2004, pp. 53-56 (4 pages), accessed online at <http://ieeexplore.ieee.org/stamp/stamp.jsp?tp=&arnumber=1329206&userType=inst&tag=1> on Feb. 25, 2013.*

*Primary Examiner* — Phuong Thao Cao
(74) *Attorney, Agent, or Firm* — Fish & Richardson P.C.

(57) ABSTRACT

Methods, systems, and apparatus, including computer programs encoded on a computer storage medium, for selecting keywords for resources. In one aspect, a method includes identifying a particular online resource that includes non-text content. Co-visitation data are obtained for the particular resource. The co-visitation data specify one or more co-requested online resources for the particular online resource. Each of the co-requested online resources were requested by a user device within a threshold period of the request for the particular online resource by the user device. Keywords are identified for each of the co-requested online resources, and can include keywords that were selected based on text content of the co-requested online resource. One or more of the identified keywords are selected as keywords for the particular resource.

30 Claims, 6 Drawing Sheets

(56) References Cited

U.S. PATENT DOCUMENTS

| | | | |
|---|---|---|---|
| 8,135,718 B1* | 3/2012 | Das et al. | 707/748 |
| 8,156,152 B2 | 4/2012 | Zou et al. | |
| 8,176,069 B2* | 5/2012 | Timm et al. | 707/767 |
| 8,220,022 B1* | 7/2012 | Pan et al. | 725/46 |
| 8,301,639 B1* | 10/2012 | Myllymaki et al. | 707/748 |
| 8,363,544 B2* | 1/2013 | Fishteyn et al. | 370/229 |
| 8,374,985 B1* | 2/2013 | Das et al. | 706/46 |
| 8,407,226 B1* | 3/2013 | Das et al. | 707/739 |
| 2002/0188435 A1 | 12/2002 | Labarge | |
| 2003/0018617 A1 | 1/2003 | Schwedes | |
| 2004/0059712 A1* | 3/2004 | Dean et al. | 707/1 |
| 2004/0158560 A1* | 8/2004 | Wen et al. | 707/4 |
| 2005/0091106 A1 | 4/2005 | Reller et al. | |
| 2006/0069982 A1* | 3/2006 | Petriuc | 715/500 |
| 2006/0074903 A1* | 4/2006 | Meyerzon et al. | 707/5 |
| 2006/0106866 A1 | 5/2006 | Green et al. | |
| 2006/0218522 A1* | 9/2006 | Hanechak | 717/105 |
| 2007/0005588 A1* | 1/2007 | Zhang et al. | 707/5 |
| 2007/0038622 A1* | 2/2007 | Meyerzon et al. | 707/5 |
| 2007/0097420 A1* | 5/2007 | Shah et al. | 358/1.15 |
| 2007/0184820 A1* | 8/2007 | Marshall | 455/414.3 |
| 2007/0271270 A1* | 11/2007 | Dubinko et al. | 707/7 |
| 2008/0027798 A1 | 1/2008 | Ramamurthi et al. | |
| 2008/0134015 A1 | 6/2008 | Milic-Frayling et al. | |
| 2008/0282186 A1 | 11/2008 | Basavaraju | |
| 2009/0210409 A1* | 8/2009 | Levin | 707/5 |
| 2009/0259646 A1* | 10/2009 | Fujita et al. | 707/5 |
| 2009/0271228 A1 | 10/2009 | Bilenko et al. | |
| 2009/0300547 A1* | 12/2009 | Bates et al. | 715/825 |
| 2009/0327281 A1 | 12/2009 | Young et al. | |
| 2010/0077174 A1* | 3/2010 | Ma et al. | 711/171 |
| 2010/0125572 A1* | 5/2010 | Poblete et al. | 707/722 |
| 2010/0268707 A1* | 10/2010 | Meyerzon et al. | 707/724 |
| 2011/0010307 A1* | 1/2011 | Bates et al. | 705/347 |
| 2011/0022609 A1 | 1/2011 | Grover | |
| 2011/0072033 A1* | 3/2011 | White et al. | 707/768 |
| 2011/0246440 A1* | 10/2011 | Kocks et al. | 707/706 |
| 2011/0302160 A1* | 12/2011 | Juan et al. | 707/723 |
| 2011/0313985 A1* | 12/2011 | Dian | 707/706 |
| 2012/0016875 A1* | 1/2012 | Jin et al. | 707/734 |
| 2012/0095834 A1 | 4/2012 | Doig et al. | |
| 2012/0158713 A1* | 6/2012 | Jin et al. | 707/728 |
| 2012/0166413 A1 | 6/2012 | LeBaron | |
| 2012/0203889 A1* | 8/2012 | Carrabis | 709/224 |
| 2012/0296918 A1* | 11/2012 | Morris et al. | 707/748 |
| 2012/0303272 A1* | 11/2012 | Studzinski | 701/450 |

* cited by examiner

SELECTING KEYWORDS USING CO-VISITATION INFORMATION

CROSS-REFERENCE TO RELATED APPLICATIONS

This application claims the benefit under 35 U.S.C. §119 (e) of U.S. Patent Application No. 61/515,364, entitled "Selecting Keywords Using Co-Visitation Information," filed Aug. 5, 2011, which is incorporated herein by reference in its entirety.

BACKGROUND

This specification relates to data processing.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

When a web page (or another resource) is requested by a user, an advertisement request is generated and transmitted to an advertisement management system that selects advertisements for presentation in the advertisement slots. The advertisement management system selects advertisements, for example, based on characteristics of the web page with which the advertisements will be presented, demographic information about the user to whom the advertisements will be presented, and/or other information about the environment in which the advertisement will be presented.

Resource keywords that have been associated with a web page and/or advertisement keywords that have been associated with an advertisement can also be used by the advertisement management system to select advertisements for presentation in the advertisement slots. Resource keywords can be specified by a publisher of the web page and/or selected, for example, based on text that is contained in the resource. However, some resources may include little or no text from which keywords can be selected.

SUMMARY

In general, one innovative aspect of the subject matter described in this specification can be embodied in methods that include the actions of identifying a particular online resource that includes non-text content; obtaining co-visitation data for the particular resource, the co-visitation data specifying one or more co-requested online resources for the particular online resource, each of the co-requested online resources being requested by a user device within a threshold period of the request for the particular online resource by the user device; identifying keywords for each of the co-requested online resources, the identified keywords for the co-requested online resources including keywords that were selected for the co-requested online resource based on text content of the co-requested online resource; and selecting one or more of the identified keywords as keywords for the particular resource.

These and other embodiments can each optionally include one or more of the following features. Method can further include the actions of receiving data indicating that a content item has been requested for presentation with the particular online resource; and responsive to receiving the data, selecting a content item for presentation with the particular online resource, the content item being selected based on the one or more identified keywords for the co-requested online resources that were selected for the particular online resource.

Obtaining co-visitation data can include the actions of receiving click log data for a plurality of user devices; determining that at least a threshold number of the user devices requested the one or more co-requested online resources after the request for the particular online resource; and identifying the one or more co-requested online resources based on the determination.

Selecting one or more of the identified keywords as keywords for the particular online resource can include the actions of determining a keyword score for each of the identified keywords, the keyword score for each identified keyword being based, at least in part, on a number of the co-requested online resources with which the identified keyword is associated; and selecting as the one or more identified keywords the identified keywords that have at least a threshold keyword score.

Determining a keyword score can further include the actions of determining a co-visitation count for each of the co-requested online resources, the co-visitation count specifying a number of times that the co-requested online resource was requested by a user device subsequent to a request for the particular online resource by the user device; and computing the keyword score for each of the identified keywords based, at least in part, on a function of the number of co-requested online resources with which the identified keyword is associated and the co-visitation counts for each of the co-requested online resources.

Methods can further include the actions of obtaining first keywords for the particular online resource, each first keyword being a keyword that was selected for the particular online resource independent of the content of the co-requested online resources for the particular online resource. Computing the keyword score for each of the identified co-requested online resources can further include computing the keyword score based, at least in part, on whether the identified keyword matches a first keyword for the co-requested online resource.

Methods can further include the actions of determining, for each request of a co-requested online resource that was received from a user device within the threshold period subsequent to a request for the particular online resource by the user device, a delay between the request by the user device for the particular online resource and the request by the user device for the co-requested online resource; and assigning a relative weight to each request for the co-requested online resource based on the delay, the relative weight that is assigned being inversely proportional to the delay. Computing the keyword score can further include the action of computing the keyword score based at least in part on the relative weight that was assigned to each request for the co-requested online resource.

Methods can further include the actions of determining a popularity score for each of the co-requested online resources, the popularity score specifying a measure of user device requests for the co-requested online resource, the measure of user requests being determined independent of whether the particular online resource was requested by the user device prior to the request for the co-requested online resource. Identifying keywords for each of the co-requested online resources can include the action of identifying keywords for each of the co-requested online resources except for the co-requested online resources having a popularity score that exceeds a popularity score threshold.

Determining a popularity score can include determining, for each of the co-requested online resources, a number of unique user devices that requested the co-requested online resource, each unique user device being represented by a unique identifier.

Methods can further include the actions of determining a popularity score for each of the co-requested online resources, the popularity score specifying a measure of user device requests for the co-requested online resource, the measure of user requests being determined independent of whether the particular online resource was requested by the user device prior to the request for the co-requested online resource. Identifying keywords for each of the co-requested online resources can include the action of identifying keywords for each of the co-requested online resources except for the co-requested online resources having a popularity score that is less than a popularity score threshold.

Particular embodiments of the subject matter described in this specification can be implemented so as to realize one or more of the following advantages. Resource keywords can be selected for resources that include less than a threshold amount of text content, such that advertisements can be selected for presentation of with the resources based on the selected resource keywords. User browsing information can be used to infer a relative measure of relevance between a resource and a co-requested resource, and this measure of relevance can be used to select resource keywords that are determined to be relevant to the resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes devices, systems, and methods for selecting resource keywords for resources using co-visitation data for the resources. Co-visitation data for a particular resource specifies one or more co-requested resources for the particular resource. A co-requested resource for a particular resource is another resource (i.e., different from the particular resource) that was requested by a user device within a threshold period following, or prior to, the particular resource being requested by the user device. For example, assume that a user device first requests a veterinarian's web page and then requests an online video of a dancing cat from a video sharing site. In this example, the video of the dancing cat will be a co-requested resource for the veterinarian's web page. In some implementations, the online video of the dancing cat can also (or alternatively) be a co-requested resource for the veterinarian's web page, for example, if designation of an advertisement as a co-requested advertisement is not dependent on the order in which the resources were selected, as described in more detail below.

Some resources, for example, can be a web page or another resource that contains primarily non-text content (e.g., music, images, videos or scripts) from which it may be difficult to determine keywords using text extraction techniques (e.g., crawling). For example, the video of the dancing cat (and non-text content in general) may not have sufficient text content from which keywords can be selected. However, co-requested resources, such as the veterinarian's web page, can have keywords that can be used as keywords for the resource that contains primarily non-text content. For example, if multiple users (e.g., a threshold number of different users) request the veterinarian's web page and then request the online video of the dancing cat from the video sharing site, then the keywords for the veterinarian's web page may be selected as keywords for the online video of the dancing kitten. In turn, content items (e.g., advertisements) can be targeted to the online video of the dancing cat using the selected keywords.

Figure 1:
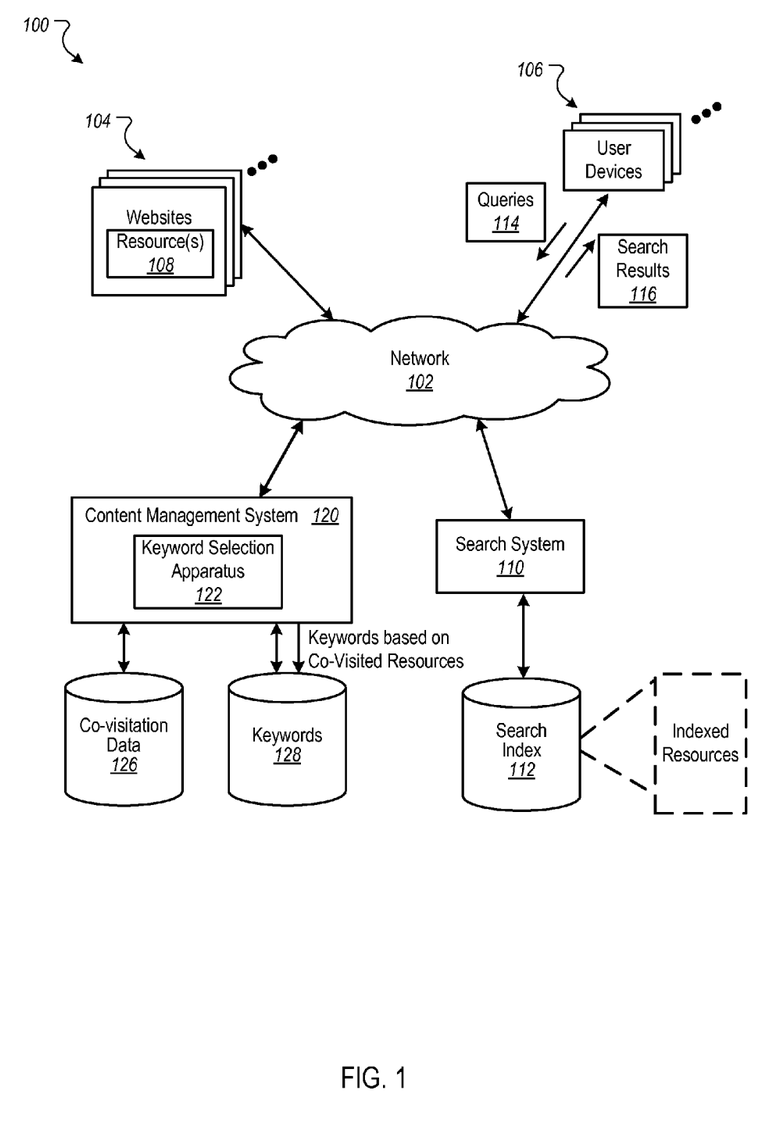
FIG. 1 is a block diagram of an example of an environment in which resource keywords are selected based on co-visitation information.

FIG. 1 is a block diagram of an example environment 100 in which keywords are selected for resources using co-visitation information. The environment 100 includes a search system 110 that provides search services and a content management system 120 that can identify keywords for a resource based on co-requested resources and can use the identified keywords to provide a content item in response to a content item request associated with the resource. The environment 100 includes a network 102, e.g., a local area network (LAN), wide area network (WAN), the Internet, or a combination of them, that connects publishers 104, user devices 106, the search system 110, and the content management system 120. The environment 100 may include many thousands of publishers and user devices 106.

A web site 104 can include one or more resources 108 associated with a domain name and hosted by one or more servers. An example web site is a collection of web pages formatted in hypertext markup language (HTML) that can contain text, images, multimedia content, and programming elements (e.g., scripts). Each web site 104 can be maintained by a publisher, e.g., an entity that manages and/or owns the web property.

A resource 108 is any data that can be provided by the web site 104 over the network 102 and that is associated with a resource address. Resources 108 include HTML pages, word processing documents, portable document format (PDF) documents, images, video, and feed sources, to name a few examples. The resources 108 can include content, e.g., words, phrases, images and sounds, and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes a user application, e.g., a web browser, to facilitate the sending and receiving of data over the network 102.

To facilitate searching of resources 108, the search system 110 can identify the resources 108 by crawling and indexing the resources 108 provided by the publishers 104.

Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify responsive resources that are predicted to be relevant to the search query 114, for example based on measures of relevance that have been computed for the responsive resources. The search system 110 selects the responsive resources, generates search results 116 that identify the responsive resources, and returns the search results 116 to the user devices 106. A search result 116 is data generated by the search system 110 that references a responsive resource for a particular search query, and includes an active link (e.g., a URL) to the responsive resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions can be stored in a search log data store. Selection data specifying user actions taken in response to search results 116 provided are also stored in a data store such as the search log data store. These actions can include whether a search result was selected by a user. In some implementations, location data specifying a locality of the user device that submitted the search query can also be stored in the search log data store. The data stored in the search log data store can be used to map search queries 114 submitted during search sessions to resources 108 that were identified in search results 116 and the actions taken by users. The search log data store can be anonymized so that the privacy of users is protected. For example, quasi-unique identifiers can be associated with users, but the actual identifying information of the users is not stored in the search log data store. Additionally, any identified user preferences or user interactions can be generalized (for example, generalized based on user demographics) rather than associated with a particular user. Encryption and obfuscation techniques can also be used to protect the privacy of users.

Search results 116 are selected to be provided to a user device 106 in response to a search query 114 based on initial result scores. Result scores are scores that represent a measure of relevance (e.g., a predicted relevance) of the resource 108 to a search query. For example, a result score for a resource 108 can be computed based on an information retrieval ("IR") score corresponding to the resource 108 and, optionally, a quality score of the resource 108 relative to other available resources. A presentation order for the search results 116 can be selected based on the result scores. In turn, data that causes presentation of the search results 116 according to the presentation order can be provided to the user device 106.

In some implementations, the relevance of a particular resource to a particular search query can be determined, in part, through statistical analysis of the search log data. Search log data is data that specifies search queries received from users and subsequent user selections (i.e., clicks) of particular search results. For example, information in the search log data store may specify that the search query "football" was received from 1,000,000 users, and that 100,000 of these users subsequently selected a search result referencing a web page for a professional football league, while 150,000 of these users selected a web page for a college football league. In some implementations, co-visitation data that are stored in (or can be derived from) the search log data store can be used to identify co-requested resources and select keywords for co-requested resources, as described in more detail below.

The content management system 120 includes a keyword selection apparatus 122 that is configured to select keywords for resources based on co-visitation data for the resources (e.g., data that specify two or more resources that were requested within a threshold period of each other). In some implementations, the keyword selection apparatus 122 selects keywords for a particular resource from the keywords that are associated with (i.e., stored with a reference to, stored at a memory location assigned to, and/or indexed according to) the co-requested resources for the particular resource. For example, as described in more detail below, the keyword selection apparatus 122 can use co-visitation data 126 to identify the co-requested resources for the particular resource, and in turn, select one or more of the keywords for the co-requested resources as keywords for the particular resource. In this way, keywords can be identified for a resource even if the resource contains primarily non-text content.

The co-visitation data 126 for a particular resource can be obtained based on click log data associated with many different user devices. In some implementations, the keyword selection apparatus 122 can analyze the click log data to determine, for each resource, how often the resource was requested by a user device following a request for the particular resource by the user device. For example, analysis of the click log data may reveal that X user devices requested web page A within a pre-specified amount of time (e.g., a threshold amount of time, such as within 1 minute) of requesting web page P (e.g., the particular web page for which keywords are being selected). The analysis of the click log data may also reveal that Y user devices requested web page B within the pre-specified amount of time of requesting web page P. In this example, the co-visitation data for web page P can indicate that web page A has a co-visitation count that is based on (e.g., equal to or proportional to) the value of X, and that web page B has a co-visitation count that is based on (e.g., equal to or proportional to) the value of Y, where X and Y are different values. Thus, each co-visitation count can be a value indicative of a number of user devices that requested the resource within the threshold period of requesting the particular resource.

The keyword selection apparatus 122 can analyze the co-visitation data for the particular resource to identify co-requested resources for the particular resource. In some implementations, the keyword selection apparatus 122 selects, as the co-requested resources for a particular resource, those resources having at least a threshold co-visitation count (e.g., the resources that were requested by at least a threshold number of the user devices requested the one or more co-requested resources after (or before) requesting for the particular resource). The threshold co-visitation count can be, for example, an absolute number of co-requests (e.g., 2000 requests) of the particular resource and the co-requested resource or a relative number of the co-requests (e.g., a normalized or scaled number that is between 0 and 1). For example, the co-visitation count can be a ratio of a number of times that the particular resource and the co-requested resource were co-requested relative to a number of times that the particular resource was requested.

Co-requested resources can have high co-visitation counts (e.g., above a minimum specified co-visitation count, such as 0.7 on a normalized scale of 0 to 1) even if the resources do not seem to be related, e.g., based on subject. For example, significantly large numbers of users (e.g., thousands of total users or more than a threshold percentage of users, such as 70% of users) who request a puppy images web page (e.g., a web page containing primarily images of puppies) may also visit web pages related to parks and/or ticks. Thus, the co-visitation data for the puppy images web page can indicate high co-visitation counts for the park-related and tick-related web pages. As a result, any of those web pages' keywords (e.g., including "parks," "recreation," "outdoors," "exercise," "ticks," "pests" and "disease") can also be selected for the puppy images web page. However, the keywords can also be filtered, for example, so that only a threshold number of keywords (e.g., 10 keywords or 10% of the keywords) or those keywords that are associated with at least a threshold number of the co-requested resources are actually selected as keywords for the puppy images web page.

In some implementations, co-visitation data 126 can be determined by analyzing logs, e.g., that identify web pages visited by a user. For example, random cookie IDs can allow a user's co-visitations across multiple web pages to be logged anonymously.

In some implementations, the keywords identified from the co-requested resources can be stored in a data store of keywords 128. In some implementations, the content management system 120 can use the keywords 128 to provide content items (e.g., advertisements) in response to content item requests. The content items can be selected, at least in part, using keywords from co-requested resources. For example, when other users subsequently visit the puppy images web page, content items (e.g., ads) presented on the web page can be selected using keywords identified from co-requested resources.

Figure 2:
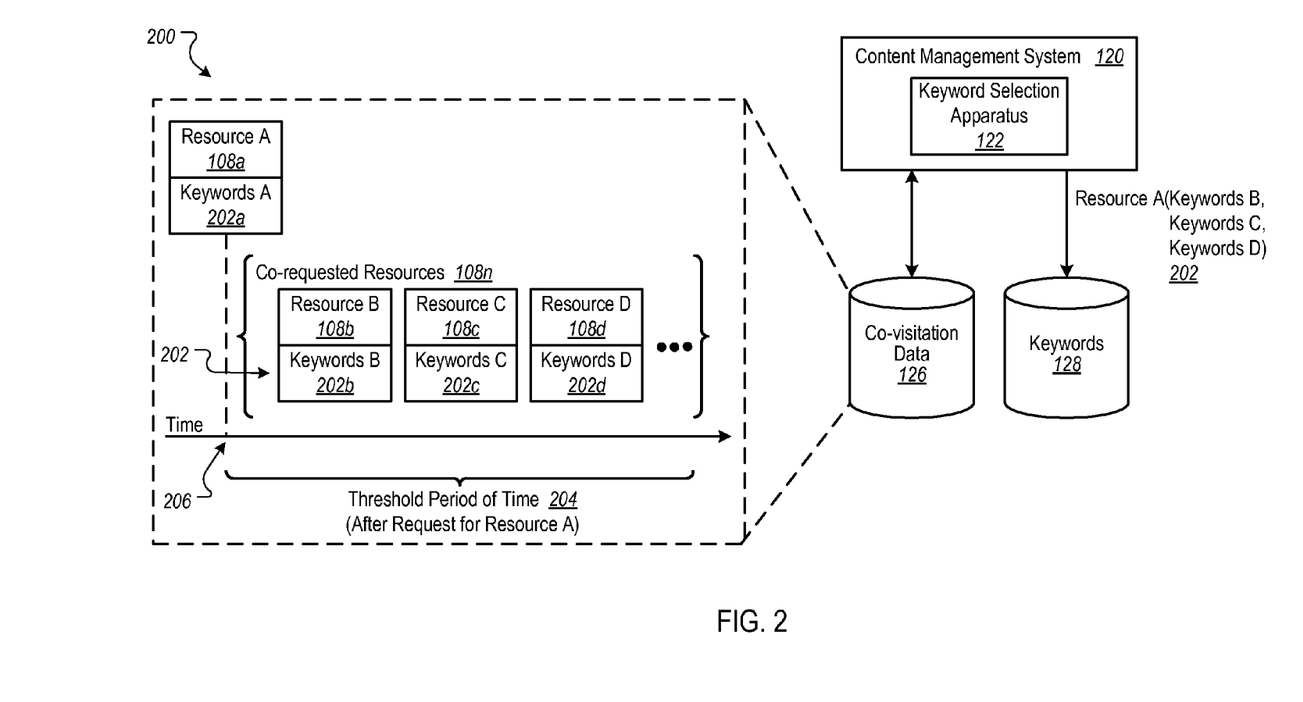
FIG. 2 is a block diagram illustrating an example of a system for selecting keywords for a resource using co-visitation information.

FIG. 2 is a block diagram illustrating a system 200 for selecting keywords for a resource using co-visitation data. As an example, the system 200 can identify keywords 202 for a resource A 108a (e.g., the puppy images web page) using keywords associated with co-requested resources 108n. For example, the co-requested resources 108n can include resources that have high co-visitation counts (e.g., co-visitation counts that exceed a pre-specified value, such as 0.7 on a normalized scale of 1.0) relative to the resource A 108a. The keyword selection apparatus 122, for example, can identify the co-requested resources 108n associated with the resource A 108a using information from the co-visitation data 126.

In a detailed example, the content management system 120, for example, can identify resources, including the resource A 108a (e.g., the puppy images web page), as candidate resources for selecting keywords using co-visitation information. The candidate resources identified can include resources that have less than a threshold number of keywords, which may be an indication of resources that include non-text content (e.g., music, images, videos or scripts) from which For example, keywords A 202 associated with the resource A 108a may include a number keywords that is below the threshold number of keywords, which may trigger selection of keywords using co-visitation data 126.

Using co-visitation data 126, for example, the keyword selection apparatus 122 can identify co-requested resources 108n. For example, the co-requested resources 108n can include resource B 108b, resource C 108c and resource D 108d that were visited (e.g., requested) within a threshold period of time 204 relative to the resource A 108a. In other words, the resources 108b-108d can be chosen as co-requested resources by the system 200 because the resources have high co-visitation counts relative to the resource A 108a. Example threshold periods of time 204 that can be specified for selecting co-requested resources can include a few minutes, an hour, or some other time period following (or prior to) a time 206 that the resource A 108a was requested by a user device.

Once the co-requested resources 108n are identified, the keyword selection apparatus 122, for example, can identify keywords for each of the co-requested resources (e.g., keywords based on text content of the resources). In some implementations, the keywords can be stored with other information in the co-visitation data 126. For example, stored information can include keywords B 202b that are associated with the resource B 108b, keywords C 202c associated with the resource C 108c, and keywords D 202d associated with the resource D 108d. As a result, any time that co-requested resources are identified from the co-visitation data 126, the corresponding keywords for the other resources can also be accessed.

After the keywords (e.g., keywords 202b-202d) of co-requested resources have been identified, the keyword selection apparatus 122 can select one or more of the identified keywords as keywords 202 for the particular resource. In some implementations, different ways for selecting the keywords can be used, as described below with reference to FIGS. 4A and 4B.

Figure 3:
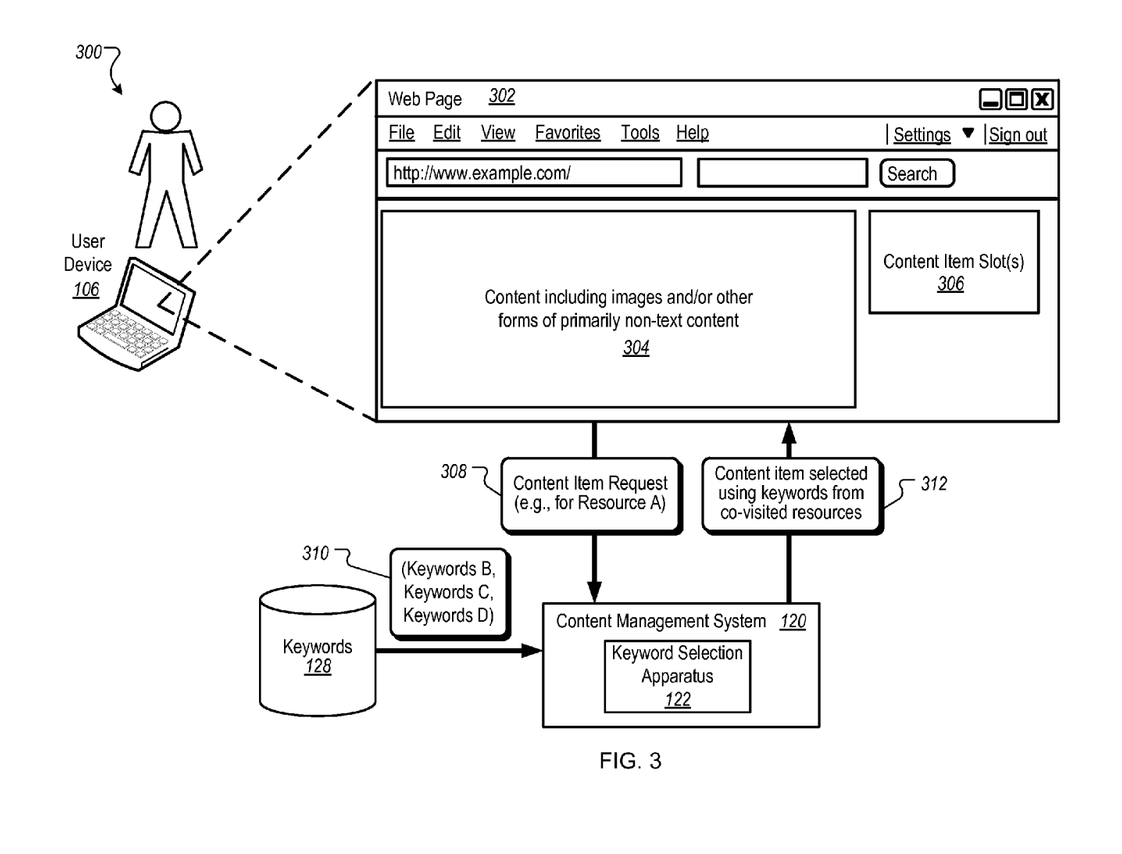
FIG. 3 is a block diagram illustrating an example of a system for selecting a content item for a resource using keywords identified using co-visitation information.

FIG. 3 is a block diagram illustrating a system 300 for selecting a content item for a resource using keywords identified using co-visitation information. For example, a web page 302 (e.g., the puppy images web page described above) can include web page content 304 that is primarily non-textual. As a result, the web page 302 may have few if any associated keywords that were previously determined using text extraction techniques. The web page 302 can include one or more content item slots 306, e.g., for presenting ads (or other content items) with other content on the web page 302. In the absence of a sufficient number of keywords having been selected for the web page 302 based on text content of the web page 302, content items (e.g., ads) for filling the content item slot(s) 306 can be selected, at least in part, using the keywords 128 for co-visited resources for the web page 306. For example, the keywords 128 can be used in addition to keywords determined for web page 306 using text extraction techniques.

For example, the web page 302 can send a content item request 308 to request a content item (e.g., an ad) to fill the content item slot 306. The content item request 308 can identify the resource (e.g., the resource A 108a). In some implementations, the content item request 308 can be received by the content management system 120. For example, in response to the content item request 308, the content management system 120 can access keywords 310 (e.g., from the keywords 128). The keywords 310, for example, can include the keywords for co-requested resources that were identified by the keyword selection apparatus 122, as described above. Using at least the keywords 310, the content management system 120 can select a content item 312 (e.g., an ad) that is targeted using targeting keywords that match (e.g., are the same as or are otherwise determined to be sufficiently similar to) one or more of the keywords 310. For example, the content item 312 selected can be an ad for dog treats, tick collars or no-leash dog parks, or any other ad that can be selected using the keywords 310 based on co-visited resources.

Figure 4A:
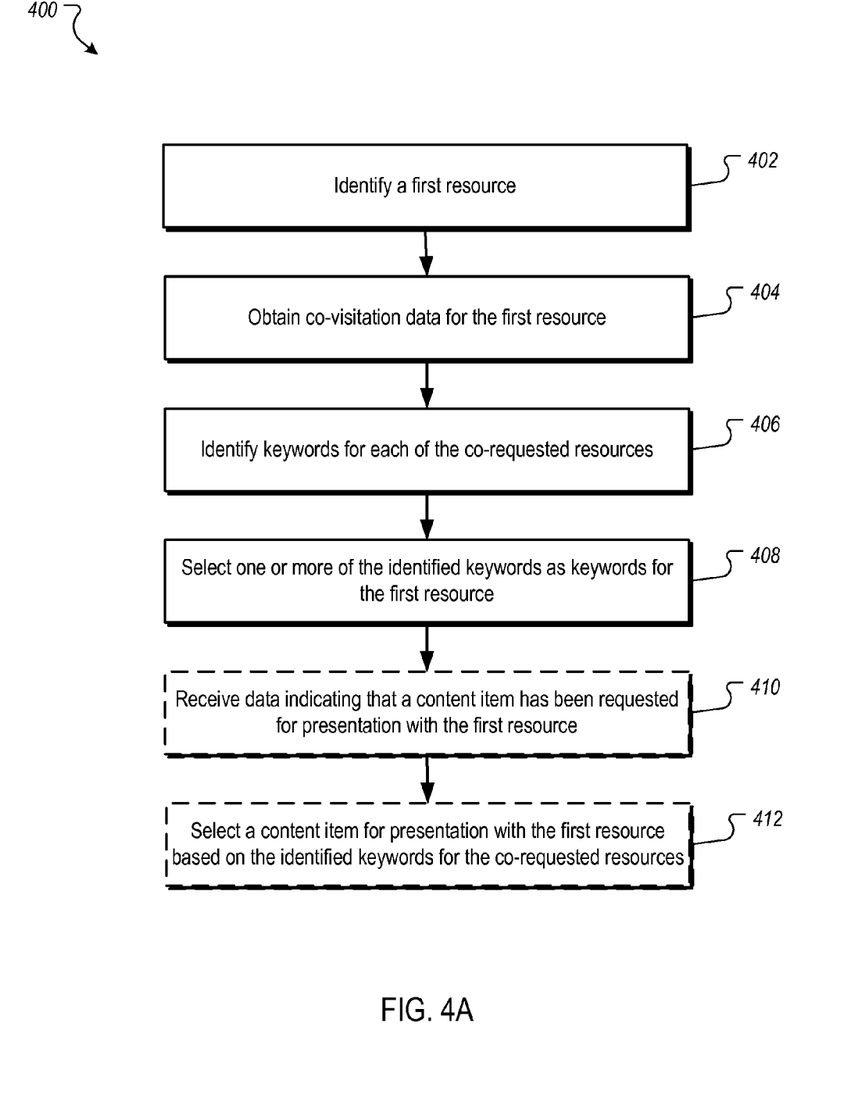
FIGS. 4A and 4B are flow charts collectively showing an example of a process for selecting keywords for a resource using co-visitation information.
Figure 4B:
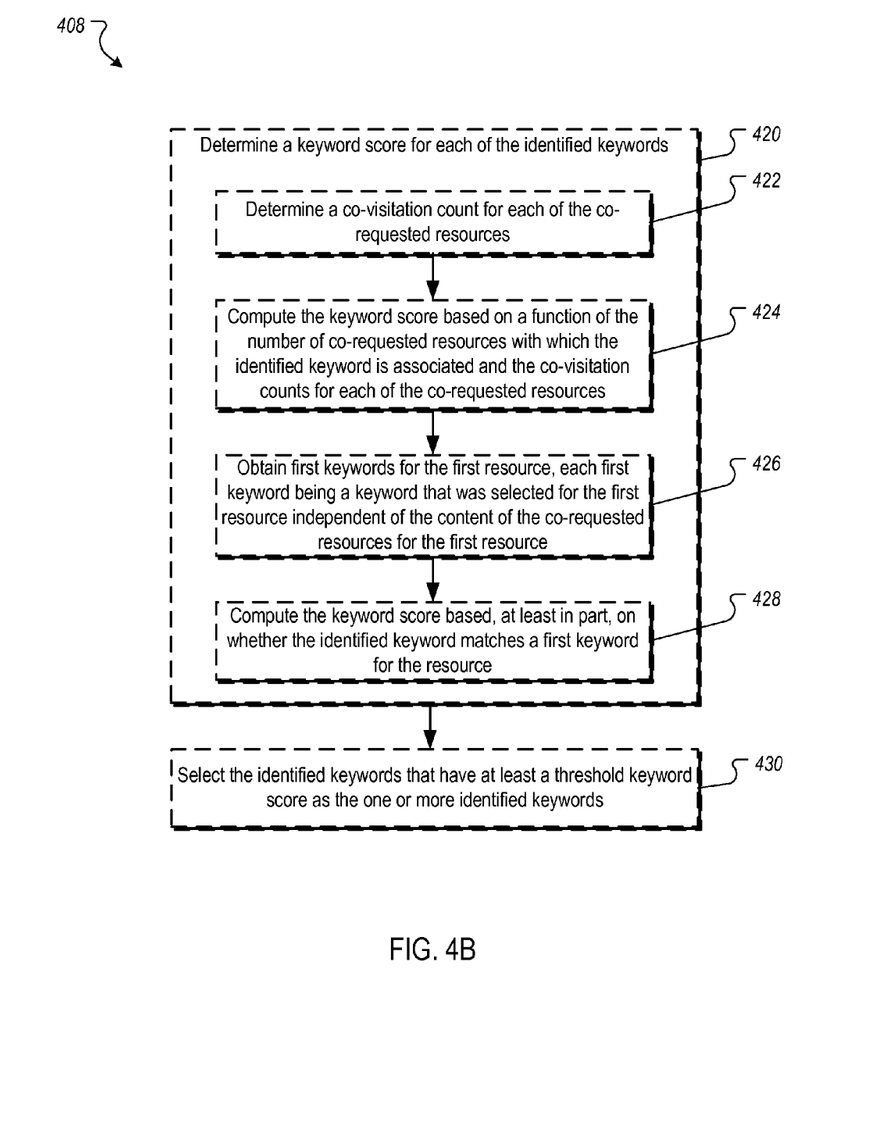

FIGS. 4A and 4B are flow charts collectively showing an example process 400 for selecting keywords for a resource using co-visitation information (e.g., co-visitation data). The process 400 is a process by which keywords can be selected for a particular resource that is identified as including non-text content (e.g., having less than a threshold number of keywords determined using text extraction techniques). The keywords are selected by analyzing co-visitation data for the particular resource, where the co-visitation data specifies one or more co-requested resources for the particular resource. For example, each of the co-requested resources can be a resource that was requested by a user device within a threshold period of (e.g., a period following or prior to) the request for the particular resource by the user device. Keywords for each of the co-requested resources are identified, including keywords that were selected for the co-requested resources based on text content of the co-requested resources. One or more of the identified keywords are selected as keywords for the particular resource.

The process 400 can be implemented by components within the environment 100, including the content management system 120 and/or the keyword selection apparatus 122. The process 400 can also be implemented as instructions stored on computer readable device such that execution of the instructions by data processing apparatus cause the data processing apparatus to perform the operations of the process 400.

Referring to FIG. 4A, a particular resource that includes non-text content is identified (402). For example, the resource can be the resource A 108a, e.g., the puppy images web page described above. The puppy images web page can be identified, for example, if the number of the web page's keywords determined using text extraction techniques are below a predefined threshold number of keywords.

Co-visitation data is obtained for the particular resource (404). The co-visitation data specifies one or more co-requested resources for the particular resource. Each of the co-requested resources is a resource that was requested by a user device within a threshold period since (or prior to) the request for the particular resource by the user device. In some implementations, co-requested resources can be required to have a minimum co-visitation count (e.g., 0.8 on a normalized scale of 1.0) relative to the particular resource. For example, each co-requested resource for a particular resource can be limited to those resources that have been co-requested with the particular resource by at least a threshold number of user devices (e.g., 5000 user devices or at least 60% of user devices that requested the particular resource). The keyword selection apparatus 122 of FIG. 1 can access the co-visitation counts for resources from the co-visitation data 126.

Keywords for each of the co-requested resources are identified (406). The identified keywords for each co-requested resource include keywords that were selected for the co-requested resource based on text content of the co-requested resource. As an example, the keyword selection apparatus 122 can identify the keywords 202b-202d for the co-requested resources 108b-108d, respectively. The keywords 202b-202d can include keywords, for example, that have been determined for the resources 108b-108d using data extraction techniques. In the current example, the keywords can include "dogs," "parks," "recreation," "outdoors," "exercise," "ticks," "pests" and "disease." In some implementations, the keywords for the co-requested resources can be identified from a set of keywords that have been previously associated with (e.g., indexed according to and/or stored with a reference to) one or more of the co-requested resources. The set of keywords can be stored, for example, in a data store from which the keywords can be accessed.

One or more of the identified keywords are selected as keywords for the particular resource (408). For example, the keyword selection apparatus 122 can identify the keywords 202, e.g., including keywords such as "dogs," "parks," "recreation," "outdoors," "exercise," "ticks," "pests" and "disease," and associate the keywords with the resource A 108a. As described in more detail below with reference to FIG. 4B, keywords can be selected for the particular resource based on keyword scores that have been determined for the respective keywords.

In some implementations, data is received that indicates that a content item has been requested for presentation with the particular resource (410). As an example, referring to FIG. 3, the content management system 120 can receive the content item request 308 for a content item (e.g., an ad) to fill the content item slot 306. For example, the content item request 308 can be a request for an ad to be presented with other web page content (e.g., images of puppies) on the web page 302.

In some implementations, a content item is selected for presentation with the particular resource (412). The selection of the content item is based on the identified keywords for the co-requested resources that were selected as keywords for the particular resource. For example, the content management system 120 can use information in the content item request 308, including identification of the resource A 108a (e.g., the web page 302 of puppy images) to access the keywords that were selected from the co-requested resources (e.g., the resources 108b-108d described above). The content management system 120 can use the keywords 310 (e.g., based on keywords 202b-202d) to select the content item 312 in response to the content item request 308.

Referring to FIG. 4B, some implementations of the process 400 include sub-steps 420-430. For example, the sub-steps 420-430 can be performed by the keyword selection apparatus 122.

In some implementations, when selecting one or more of the identified keywords as keywords for the particular resource (408), a keyword score is determined for each of the identified keywords (420). The keyword score for each identified keyword is based, at least in part, on a number of the co-requested resources with which the identified keyword is associated. As an example, the keyword selection apparatus 122 can determine keyword scores for each of the keywords among the keywords B 202b, keywords C 202c, and keywords D 202d. The individual keywords among the keywords B 202b can each have an individual keyword score that is indicative of the number of co-requested resources with which the keyword is associated (e.g., indexed according to and/or stored with a reference to). Further, any single term (e.g., "dogs") can be included in two or more of the keywords B 202b, keywords C 202c, and keywords D 202d, which can result in a higher keyword score for that keyword.

In some implementations, the keyword score can be based, at least in part, on a co-visitation count that has been determined for each (or a proper subset) of the co-requested resources (422). The co-visitation count specifies a number of times that the co-requested resource was requested by a user device subsequent to (and/or prior to) a request for the particular resource by the user device. For example, the keyword selection apparatus 122 of FIG. 1 can determine a co-visitation count for each keyword (e.g., "dogs," "parks," etc.) based on the number of times co-requested resources were requested after the request for the particular resource (e.g., the puppy images web page). As a result, the co-visitation count for the keyword "parks" can be 1000 if co-requested resources (e.g., resources 108b-108d) having the associated keyword "parks" were requested 1000 times. Similarly, the co-visitation count for the keyword "dogs" can be 2000 if co-requested resources having the associated keyword "dogs" were requested 2000 times.

In some implementations, when a keyword score is determined for each of the identified keywords (410), the keyword score can be computed for each of the identified keywords based, at least in part, on a function of the number of co-requested resources with which the identified keyword is associated and the co-visitation counts for each of the co-requested resources (424). The keyword score for each keyword can be proportional to the co-visitation count for the co-requested resource from which the keyword was identified. As an example, the keyword selection apparatus 122 can use the co-visitation counts of 1000 and 2000 in the example above for determining the keyword scores for the keywords "parks" and "dogs," respectively. The co-visitation counts can be normalized to a standard scale (e.g., 0-10 or 0-1) in order to contain the contribution of the co-visitation counts to the keyword scores.

In some implementations, when determining a keyword score for the identified keywords (410), first keywords are obtained for the particular resource (426). Each first keyword is a keyword that was selected for the particular resource independent of the content of the co-requested resources for the particular resource. For example, the first keywords can be keywords that were selected for the particular resource based on search queries that led to requests for the particular resource from a search results page.

The keyword score for each of the identified keywords from the co-requested resources can be computed based, at least in part, on whether the identified keyword matches a first keyword for the resource (428). For example, keywords A 202a associated with the resource A 108a (e.g., the puppy images web page) may include the keywords "puppies" and "parks" that were determined from image captions or other text on the web page (e.g., using text extraction techniques). If the keyword "parks" is also one of the keywords associated with the co-requested resources 108c-108d, then the keyword score for "parks" can be increased based in part on the identified match, e.g., resulting in a higher keyword score.

In some implementations, when selecting one or more of the identified keywords as keywords for the particular resource (408), keywords are selected as the one or more identified keywords if the keywords have at least a threshold keyword score (430). As an example, the keyword selection apparatus 122 can limit the selection of keywords for the resource A 108a to keywords that have at least a minimum keyword score (e.g., 0.7 on a normalized scale of 1.0). In this way, the keywords selected for the resource A 108a can be the keywords that are generally more associated with co-requested resources, as determined by keyword scores.

In some implementations, various keyword-scoring techniques can be used. In some implementations, scoring can be performed using weighted scores (e.g., based on a time delay between the request for the particular resource and the request for a co-requested resource) and/or non-weighted scores. For example, the weight that is applied to each request for the particular resource can be inversely proportional to the amount of time between the request for the particular resources and the request for the co-requested resource (e.g., the weight can initially be set to 1.0 and linearly (or non-linearly) decrease to 0 as the time between the requests increases. In some implementations, the weight can be set to 0 if the request for the particular resource and the request for the co-requested resource are not received within a specified amount of time (e.g., 7 minutes) of each other.

Non-weighted keyword-scoring can be used, in part, to determine a keyword score for keywords that have been previously associated with each resource (e.g., a web page) W. For example, for every search query q that led to a user request of web page W or prominent term that occurs on W (e.g., terms that are identified as prominent, such as titles, by text extraction techniques), the keyword score can be initialized to a starting value, as illustrated by relationship (1).

$$\text{KeywordScore}[W,q]=1 \quad (1)$$

The keyword score can be used, in part, to determine which keyword is used to select a content item for presentation with the page. For example, when a user U visits the web page W, a keyword d can be chosen with a probability that is proportional to KeywordScore[W,d] to select a content item (e.g., to select an ad). Keyword scores can be updated based on the identification of co-requested resources and their corresponding keywords, e.g., incremented in the following nested loop logic (2).

$$\text{For each web page } P \text{ in a set of CovisitedWebpages}$$
$$[U,W]: \text{For each keyword } k \text{ in the set of Keywords for page } [P]: \text{KeywordScore}[W,k]+=1 \quad (2)$$

In some implementations, the contribution of a co-requested keyword to a keyword score can be based, in part, on a weight that has been associated with the co-requested keyword. As described below, the weight that is associated with each co-requested resource can be based, for example, on one or more of time delays between requests for the co-requested resources and/or popularity scores for the co-requested resources from which the keywords were identified.

In some implementations, the contribution of a co-requested keyword to the keyword score is based on time delays between the request for the particular resource (e.g., the resource A 108a) and requests for the co-requested resources (e.g., resources 108b-108d) with which the co-requested keyword is associated. As an example, delays can be determined for each request of the co-requested resources 108b-108d that was received from a user device within the threshold period subsequent (or prior) to the request for the resource A 108a by the user device. In some implementations, a relative weight based on the delay can be assigned to each request for the co-requested resources 108b-108d, and the relative weight can be inversely proportional to the delay, such that the contribution of the co-requested resource to the keyword score is inversely proportional to the delay. For example, if the delay is lower than a minimum threshold time, the weight may be 1.0, such that the keyword score may be increased by 1.0 (or some other standard incremental value), while the weight may be 0.0 (e.g., such that the keyword score may not be increased at all) if the delay is greater than a maximum threshold time. For delays that are between the minimum and maximum threshold time, the weight can decay (e.g., from 1.0) in proportion to the delay. The keyword selection apparatus 122 can compute each keyword score based at least in part on the relative weight that was assigned to each request for the co-requested resources 108b-108d.

In some implementations, computing keyword scores can be based on popularity scores for co-requested resources, e.g., to prevent selecting keywords for co-requested resources that are extremely popular in general (e.g., a breaking oil spill news story of the day). For example, the keyword selection apparatus 122 can determine a popularity score for each of the co-requested resources 108b-108d. The popularity score, for example, can specify a measure of the number of user device requests for the co-requested resource. The measure of the number of user device requests can be determined independently of whether the particular resource (e.g., the resource A 108a) was requested by the user device prior to the request for the co-requested resource. For example, the measure of the number of user device requests for a particular co-requested resource can be a total number of user devices that requested the co-requested resource over a previous pre-specified period of time (e.g., 1 hour, 1 day, or 1 week). When the keyword selection apparatus 122 identifies keywords for each of the co-requested resources, the keyword selection apparatus 122 can disregard (e.g., filter) the keywords for a co-requested resource that has a popularity score that exceeds a popularity score threshold (e.g., 5000 users). In this way, overly-popular resources can be removed from consideration that may otherwise dilute the significance of co-requested resources, e.g., by selecting "oil spill" as a keyword for large numbers of resources.

In some implementations, popularity scores can also be used to avoid selecting keywords for co-requested resources that are extremely unpopular in general. As an example, the keyword selection apparatus 122 can determine a popularity score for each of the co-requested resources 108b-108d, as described above. Then, when the keyword selection apparatus 122 identifies keywords for each of the co-requested resources, the keyword selection apparatus 122 can disregard the keywords for any co-requested resource that has a popularity score that is less than a popularity score threshold. In this way, selection of keywords, for example, that may have less monetization potential for serving ads (e.g., based on user interests) can be avoided.

In some implementations, popularity scores can be based on a number of unique user devices that requested the co-requested resource. For example, the popularity scores that are determined for each of the co-requested resources 108b-108d can be based on the number of unique user devices 106 that visited the co-requested resources 108b-108d, e.g., as determined from unique identifiers (e.g., IP addresses) for the user devices 106, such that a large number of requests from a single user device alone will not result in keywords from co-requested resources being associated with a particular resource.

Figure 5:
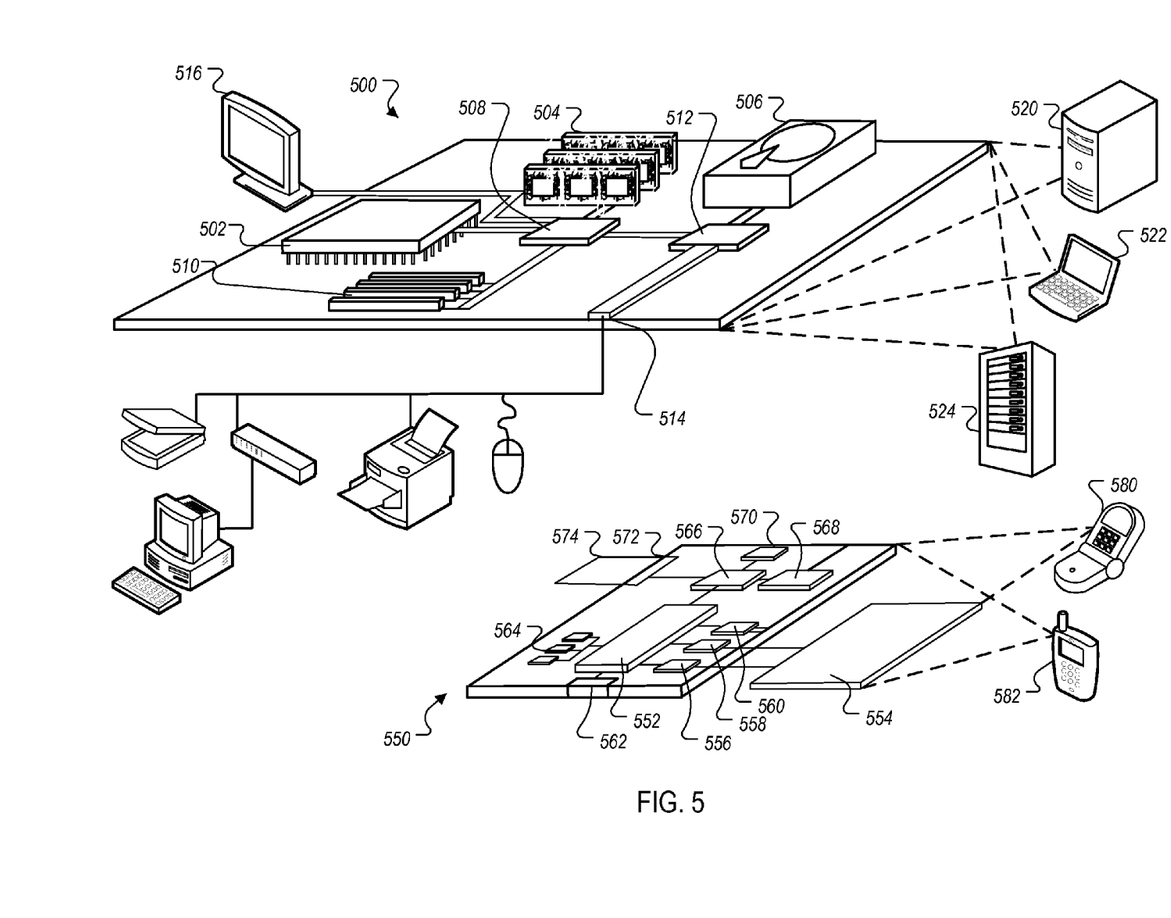
FIG. 5 is a block diagram of example computing devices that may be used to implement the systems and methods described in this document.

FIG. 5 is a block diagram of computing devices 500, 550 that may be used to implement the systems and methods described in this document. The computing devices 500, 550 may be implemented as one or more clients or one or more servers, or combinations of clients and servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    identifying a particular online resource that includes non-text content;
    obtaining co-visitation data for the particular online resource, the co-visitation data specifying one or more co-requested online resources for the particular online resource, each of the one or more co-requested online resources being requested by a user device within a threshold period of a request for the particular online resource by the user device;
    identifying keywords for each of the one or more co-requested online resources, the identified keywords for each co-requested online resource in the one or more co-requested online resources including keywords that were selected for the co-requested online resource based on text content of the co-requested online resource;
    determining, for each of one or more requests of a co-requested online resource that was received from the user device within the threshold period subsequent to a request by the user device for the particular online resource, a delay between the request by the user device for the particular online resource and the request by the user device for the co-requested online resource;
    assigning a relative weight to each of the one or more requests for the co-requested online resource based, at least in part, on the delay;
    determining a keyword score for each of one or more of the identified keywords, the keyword score for each identified keyword being determined based, at least in part, on a number of the one or more co-requested online resources with which the identified keyword is associated and the relative weight that was assigned to each of the one or more requests for the co-requested online resource; and
    selecting, based at least in part, on the keyword scores for the identified keywords, one or more of the identified keywords as keywords for the particular online resource.

2. The method of claim 1, further comprising:
    receiving data indicating that a content item has been requested for presentation with the particular online resource; and
    responsive to receiving the data, selecting a content item for presentation with the particular online resource, the content item being selected based on the one or more of the identified keywords for the one or more co-requested online resources that were selected for the particular online resource.

3. The method of claim 1, wherein obtaining co-visitation data comprises:
    receiving click log data for a plurality of user devices;
    determining that at least a threshold number of the plurality of user devices requested the one or more co-requested online resources after the request for the particular online resource; and
    identifying the one or more co-requested online resources based on the determination.

4. The method of claim 1, wherein:
    assigning a relative weight to each request for the co-requested online resource based on the delay comprises assigning a relative weight that is inversely proportional to the delay.

5. The method of claim 1, wherein selecting one or more of the identified keywords as keywords for the particular online resource comprises:
    selecting as the one or more of the identified keywords the identified keywords that have at least a threshold keyword score.

6. The method of claim 5, wherein determining a keyword score further comprises:
    determining a co-visitation count for each of the one or more co-requested online resources, the co-visitation count specifying a number of times that the co-requested online resource was requested by a user device subsequent to a request for the particular online resource by the user device; and
    computing the keyword score for each of the identified keywords based, at least in part, on a function of the number of co-requested online resources with which the identified keyword is associated and the co-visitation count for each of the one or more co-requested online resources.

7. The method of claim 6, further comprising:
    obtaining first keywords for the particular online resource, each first keyword being a keyword that was selected for the particular online resource independent of the content of the one or more co-requested online resources for the particular online resource, wherein computing the keyword score for each of the identified keywords further comprises computing the keyword score based, at least in part, on whether the identified keyword matches a first keyword for the particular online resource.

8. The method of claim 6, further comprising:
determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein
identifying keywords for each of the one or more co-requested online resources comprises identifying keywords for each of the one or more co-requested online resources except for the co-requested online resources having a popularity score that exceeds a popularity score threshold.

9. The method of claim 8, wherein determining a popularity score comprises determining, for each of the one or more co-requested online resources, a number of unique user devices that requested the co-requested online resource, each unique user device being represented by a unique identifier.

10. The method of claim 6, further comprising:
determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein
identifying keywords for each of the one or more co-requested online resources comprises identifying keywords for each of the one or more co-requested online resources except for the co-requested online resources having a popularity score that is less than a popularity score threshold.

11. A non-transitory computer storage medium encoded with a computer program, the computer program comprising instructions that when executed by a data processing apparatus cause the data processing apparatus to perform operations comprising:
identifying a particular online resource that includes non-text content;
obtaining co-visitation data for the particular online resource, the co-visitation data specifying one or more co-requested online resources for the particular online resource, each of the one or more co-requested online resources being requested by a user device within a threshold period of a request for the particular online resource by the user device;
identifying keywords for each of the one or more co-requested online resources, the identified keywords for each co-requested online resource in the one or more co-requested online resources including keywords that were selected for the co-requested online resource based on text content of the co-requested online resource;
determining, for each of one or more requests of a co-requested online resource that was received from the user device within the threshold period subsequent to a request by the user device for the particular online resource, a delay between the request by the user device for the particular online resource and the request by the user device for the co-requested online resource;
assigning a relative weight to each of the one or more requests for the co-requested online resource based, at least in part, on the delay;
determining a keyword score for each of one or more of the identified keywords, the keyword score for each identified keyword being determined based, at least in part, on a number of the one or more co-requested online resources with which the identified keyword is associated and the relative weight that was assigned to each of the one or more requests for the co-requested online resource; and
selecting, based at least in part, on the keyword scores for the identified keywords, one or more of the identified keywords as keywords for the particular online resource.

12. The non-transitory computer storage medium of claim 11, wherein the computer program further comprises instructions that when executed by the data processing apparatus cause the data processing apparatus to perform operations comprising:
receiving data indicating that a content item has been requested for presentation with the particular online resource; and
responsive to receiving the data, selecting a content item for presentation with the particular online resource, the content item being selected based on the one or more of the identified keywords for the one or more co-requested online resources that were selected for the particular online resource.

13. The non-transitory computer storage medium of claim 11, wherein obtaining co-visitation data comprises:
receiving click log data for a plurality of user devices;
determining that at least a threshold number of the plurality of user devices requested the one or more co-requested online resources after the request for the particular online resource; and
identifying the one or more co-requested online resources based on the determination.

14. The non-transitory computer storage medium of claim 11, wherein
assigning a relative weight to each request for the co-requested online resource based on the delay comprises assigning a relative weight that is inversely proportional to the delay.

15. The non-transitory computer storage medium of claim 11, wherein selecting one or more of the identified keywords as keywords for the particular online resource comprises:
selecting as the one or more of the identified keywords the identified keywords that have at least a threshold keyword score.

16. The non-transitory computer storage medium of claim 15, wherein determining a keyword score further comprises:
determining a co-visitation count for each of the one or more co-requested online resources, the co-visitation count specifying a number of times that the co-requested online resource was requested by a user device subsequent to a request for the particular online resource by the user device; and
computing the keyword score for each of the identified keywords based, at least in part, on a function of the number of co-requested online resources with which the identified keyword is associated and the co-visitation count for each of the one or more co-requested online resources.

17. The non-transitory computer storage medium of claim 16, wherein the computer program further comprises instructions that when executed by the data processing apparatus cause the data processing apparatus to perform operations comprising:

obtaining first keywords for the particular online resource, each first keyword being a keyword that was selected for the particular online resource independent of the content of the one or more co-requested online resources for the particular online resource, wherein     computing the keyword score for each of the identified keywords further comprises computing the keyword score based, at least in part, on whether the identified keyword matches a first keyword for the particular online resource.

18. The non-transitory computer storage medium of claim 16, wherein the computer program further comprises instructions that when executed by the data processing apparatus cause the data processing apparatus to perform operations comprising:

determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein     identifying keywords for each of the one or more co-requested online resources comprises identifying keywords for each of the one or more co-requested online resources except for the co-requested online resources having a popularity score that exceeds a popularity score threshold.

19. The non-transitory computer storage medium of claim 18, wherein determining a popularity score comprises determining, for each of the one or more co-requested online resources, a number of unique user devices that requested the co-requested online resource, each unique user device being represented by a unique identifier.

20. The non-transitory computer storage medium of claim 16, wherein the computer program further comprises instructions that when executed by the data processing apparatus cause the data processing apparatus to perform operations comprising:

determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein     identifying keywords for each of the one or more co-requested online resources comprises identifying keywords for each of the one or more co-requested online resources except for the co-requested online resources having a popularity score that is less than a popularity score threshold.

21. A system comprising:

a data store storing co-visitation data for a plurality of online resources, the co-visitation data specifying, for each of the plurality of online resources, one or more co-requested online resources for the online resource, each of the one or more co-requested online resources for the online resource being requested by a user device within a threshold period of the request for the online resource by the user device; and     a data processing apparatus configured to interact with the data store, the data processing apparatus being further configured to perform operations comprising:

identifying a particular online resource that includes non-text content;

obtaining, from the data store, co-visitation data for the particular online resource, the co-visitation data specifying one or more co-requested online resources for the particular online resource, each of the one or more co-requested online resources being requested by a user device within a threshold period of a request for the particular online resource by the user device;

identifying keywords for each of the one or more co-requested online resources, the identified keywords for each co-requested online resource in the one or more co-requested online resources including keywords that were selected for the co-requested online resource based on text content of the co-requested online resource;

determining, for each of one or more requests of a co-requested online resource that was received from the user device within the threshold period subsequent to a request by the user device for the particular online resource, a delay between the request by the user device for the particular online resource and the request by the user device for the co-requested online resource;

assigning a relative weight to each of the one or more requests for the co-requested online resource based, at least in part, on the delay;

determining a keyword score for each of one or more of the identified keywords, the keyword score for each identified keyword being determined based, at least in part, on a number of the one or more co-requested online resources with which the identified keyword is associated and the relative weight that was assigned to each of the one or more requests for the co-requested online resource; and         selecting, based at least in part, on the keyword scores for the identified keywords, one or more of the identified keywords as keywords for the particular online resource.

22. The system of claim 21, wherein the data processing apparatus is further configured to perform operations including:

receiving data indicating that a content item has been requested for presentation with the particular online resource; and     responsive to receiving the data, selecting a content item for presentation with the particular online resource, the content item being selected based on the one or more of the identified keywords for the one or more co-requested online resources that were selected for the particular online resource.

23. The system of claim 21, wherein obtaining co-visitation data comprises:

receiving click log data for a plurality of user devices;

determining that at least a threshold number of the plurality of user devices requested the one or more co-requested online resources after the request for the particular online resource; and     identifying the one or more co-requested online resources based on the determination.

24. The system of claim 21, wherein selecting one or more of the identified keywords as keywords for the particular online resource comprises:

selecting as the one or more of the identified keywords the identified keywords that have at least a threshold keyword score.

25. The system of claim 24, wherein determining a keyword score further comprises:
determining a co-visitation count for each of the one or more co-requested online resources, the co-visitation count specifying a number of times that the co-requested online resource was requested by a user device subsequent to a request for the particular online resource by the user device; and
computing the keyword score for each of the identified keywords based, at least in part, on a function of the number of co-requested online resources with which the identified keyword is associated and the co-visitation count for each of the one or more co-requested online resources.

26. The system of claim 25, wherein the data processing apparatus is further configured to perform operations comprising:
obtaining first keywords for the particular online resource, each first keyword being a keyword that was selected for the particular online resource independent of the content of the one or more co-requested online resources for the particular online resource, wherein
computing the keyword score for each of the identified keywords further comprises computing the keyword score based, at least in part, on whether the identified keyword matches a first keyword for the particular online resource.

27. The system of claim 21, wherein:
assigning a relative weight to each request for the co-requested online resource based on the delay comprises assigning a relative weight that is inversely proportional to the delay.

28. The system of claim 25, wherein the data processing apparatus is further configured to perform operations comprising:
determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein
identifying keywords for each of the one or more co-requested online resources comprises identifying keywords for each of the one or more co-requested online resources except for the co-requested online resources having a popularity score that exceeds a popularity score threshold.

29. The system of claim 28, wherein determining a popularity score comprises determining, for each of the one or more co-requested online resources, a number of unique user devices that requested the co-requested online resource, each unique user device being represented by a unique identifier.

30. The system of claim 25, wherein the data processing apparatus is further configured to perform operations comprising:
determining a popularity score for each of the one or more co-requested online resources, the popularity score specifying a measure of user device requests for the co-requested online resource, the measure of user device requests being determined independent of whether the particular online resource was requested by the user device prior to the request for the co-requested online resource, wherein
identifying keywords for each of the one or more co-requested online resources comprises identifying keywords for each of the one or more co-requested online resources except for the co-requested online resources having a popularity score that is less than a popularity score threshold.

* * * * *